(12) United States Patent
Shiono et al.

(10) Patent No.: US 12,734,614 B2
(45) Date of Patent: Sep. 15, 2026

(54) LASER PROCESSING APPARATUS

(71) Applicant: DISCO CORPORATION, Tokyo (JP)

(72) Inventors: Koji Shiono, Tokyo (JP); Haruki Kamiyama, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 1127 days.

(21) Appl. No.: 17/664,739

(22) Filed: May 24, 2022

(65) Prior Publication Data

US 2022/0379408 A1 Dec. 1, 2022

(30) Foreign Application Priority Data

Jun. 1, 2021 (JP) ................................ 2021-092232

(51) Int. Cl.

| | |
|---|---|
| ***B23K 26/50*** | (2014.01) |
| ***B23K 26/06*** | (2014.01) |
| ***B23K 26/064*** | (2014.01) |
| ***B23K 26/067*** | (2006.01) |
| ***B23K 26/082*** | (2014.01) |

(52) U.S. Cl.

CPC ............ *B23K 26/50* (2015.10); *B23K 26/064* (2015.10); *B23K 26/0665* (2013.01); *B23K 26/067* (2013.01); *B23K 26/082* (2015.10)

(58) Field of Classification Search

CPC .... B23K 26/50; B23K 26/064; B23K 26/082; B23K 26/0665; B23K 26/067

USPC .................................................... 219/121.73

See application file for complete search history.

(56) References Cited

U.S. PATENT DOCUMENTS

| | | | | |
|---|---|---|---|---|
| 7,733,497 | B2 * | 6/2010 | Yun et al. | G01B 11/02 356/497 |
| 8,960,909 | B2 * | 2/2015 | Makihira et al. | G01B 9/90291 |
| 10,406,631 | B2 * | 9/2019 | Sampei et al. | B23K 26/0853 |
| 11,612,956 | B2 * | 3/2023 | Nakagawa | B23K 26/064 |

(Continued)

FOREIGN PATENT DOCUMENTS

| | | |
|---|---|---|
| CN | 106077966 A | 11/2016 |
| CN | 207873385 U | 9/2018 |

(Continued)

OTHER PUBLICATIONS

Seno article on opto-acoustic technology (Year: 2025).*

(Continued)

*Primary Examiner* — Topaz L. Elliott
*Assistant Examiner* — Solan Oliva
(74) *Attorney, Agent, or Firm* — Greer, Burns & Crain, Ltd

(57) ABSTRACT

A laser beam irradiation unit of a laser processing apparatus includes a first splitting unit that causes a laser beam emitted from a laser oscillator to branch into a first optical path and a second optical path, a first beam condenser that focuses the laser beam having been introduced to the first optical path, and a second beam condenser that focuses the laser beam having been introduced to the second optical path. The laser beam irradiation unit further includes a second splitting unit on the first optical path between the first splitting unit and the first beam condenser that splits the laser beam into at least two laser beams, and a laser beam scanning unit on the second optical path between the first splitting unit and the second beam condenser that executes scanning with the laser beam and introduces the laser beam to the second beam condenser.

17 Claims, 6 Drawing Sheets

(56) References Cited

U.S. PATENT DOCUMENTS

| | | | | |
|---|---|---|---|---|
| 2016/0311058 | A1 | 10/2016 | Nayuki | |
| 2019/0094016 | A1* | 3/2019 | Ishigaki | G01B 11/24 |
| 2020/0398370 | A1* | 12/2020 | Nomaru | B23K 26/0622 |

FOREIGN PATENT DOCUMENTS

| | | | | |
|---|---|---|---|---|
| EP | 3 590 648 | A1 | 1/2020 | |
| JP | 2010207879 | A | 9/2010 | |
| JP | 2016068149 | A | 5/2016 | |
| JP | 2016208035 | A | 12/2016 | |
| JP | 2017177194 | A | 10/2017 | |
| JP | 2017177194_A | A | * 10/2017 | B23K 26/067 |
| NL | 2026427 | A | 5/2021 | |

OTHER PUBLICATIONS

JP_2017177194_A_I English Description (Year: 2017).*

Office Action issued in counterpart Japanese patent application No., 2021-092232, dated Oct. 8, 2024.

Office Action issued by the German Patent Office for corresponding Patent Application No. 10 2022 205 178.5, mailed Apr. 24, 2025.

Office Action issued by the Chinese Patent Office for corresponding Patent Application No. 202210596337.8, dated May 15, 2026 with translation (13 pages).

* cited by examiner

LASER PROCESSING APPARATUS

BACKGROUND OF THE INVENTION

Field of the Invention

The present invention relates to a laser processing apparatus.

Description of the Related Art

As a method for dividing a semiconductor wafer into chips, a method is known in which the wafer is divided by executing irradiation with a laser beam along planned dividing lines set in the wafer for ablation processing. In particular, a method in which a scanning optical system that executes scanning with a laser beam is disposed between a laser oscillator and a beam condenser and a wafer is irradiated with the laser beam while scanning with the laser beam is executed can efficiently form a dividing groove with a sufficient width, and therefore, is expected to improve the productivity (refer to Japanese Patent Laid-open No. 2016-068149).

SUMMARY OF THE INVENTION

However, in the case of executing processing by the above-described method for a wafer on a front surface of which a functional layer including a plurality of Low-k films is stacked, for example, there is a possibility that the stacked functional layer is peeled off and reaches a device to damage a chip.

Thus, an object of the present invention is to provide a laser processing apparatus that can efficiently divide a workpiece while suppressing peeling-off of a functional layer stacked on the workpiece.

In accordance with an aspect of the present invention, there is provided a laser processing apparatus including a holding unit that holds a workpiece, a laser beam irradiation unit that focuses a pulsed laser beam and irradiates the workpiece held on the holding unit with the laser beam to execute processing, and a movement unit that relatively moves the holding unit and a focal point of the laser beam. The laser beam irradiation unit includes a laser oscillator, a first splitting unit that causes the laser beam emitted from the laser oscillator to branch into a first optical path and a second optical path, a first beam condenser that focuses the laser beam having been introduced to the first optical path, a second beam condenser that focuses the laser beam having been introduced to the second optical path, a second splitting unit that is disposed on the first optical path between the first splitting unit and the first beam condenser and that splits the laser beam having been introduced to the first optical path into at least two laser beams, and a laser beam scanning unit that is disposed on the second optical path between the first splitting unit and the second beam condenser and that executes scanning with the laser beam having been introduced to the second optical path and introduces the laser beam to the second beam condenser.

Preferably, the laser beam focused by the first beam condenser is separate forward in a processing feed direction of the movement unit from the laser beam focused by the second beam condenser.

Preferably, the second splitting unit splits the laser beam in a width direction of a planned dividing line set in the workpiece to form at least two lines of laser-processed grooves along the planned dividing line.

Preferably, the laser beam scanning unit includes a polygon scanner that executes scanning with the laser beam in a processing feed direction of the movement unit and introduces the laser beam to the second beam condenser, and an acousto-optic element that is disposed on the first optical path between the laser oscillator and the polygon scanner and that executes scanning with the laser beam in the width direction of a planned dividing line set in the workpiece.

Preferably, the movement unit includes a beam condenser movement unit that moves the first beam condenser in a direction parallel to an upper surface of the workpiece, relative to the second beam condenser.

Preferably, the laser beam irradiation unit further includes a third splitting unit that is disposed on an optical path between the laser oscillator and the first splitting unit and that causes the laser beam emitted from the laser oscillator to further branch into a third optical path, a third beam condenser that focuses the laser beam having been introduced to the third optical path, and a fourth splitting unit that is disposed on the third optical path between the third splitting unit and the third beam condenser and that splits the laser beam having been introduced to the third optical path into at least two laser beams. The laser beam focused by the first beam condenser and the laser beam focused by the third beam condenser are separate on sides opposite to each other across the laser beam focused by the second beam condenser, in a processing feed direction of the movement unit.

Preferably, the laser beam irradiation unit further includes a third splitting unit that is disposed on the first optical path between the first splitting unit and the second splitting unit and that causes the laser beam having been introduced to the first optical path to further branch into a third optical path, a third beam condenser that focuses the laser beam having been introduced to the third optical path, and a fourth splitting unit that is disposed on the third optical path between the third splitting unit and the third beam condenser and that splits the laser beam having been introduced to the third optical path into at least two laser beams. The laser beam focused by the first beam condenser and the laser beam focused by the third beam condenser are separate on sides opposite to each other across the laser beam focused by the second beam condenser, in a processing feed direction of the movement unit.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Embodiments of the present invention will be described in detail below with reference to the drawings. The present invention is not limited by contents described in the following embodiments. Further, what can be easily envisaged by those skilled in the art and what are substantially the same are included in constituent elements described below. Moreover, configurations described below can be combined as appropriate. In addition, various kinds of omission, replacement, or change of a configuration can be made without departing from the gist of the present invention.

First Embodiment

Figure 1:
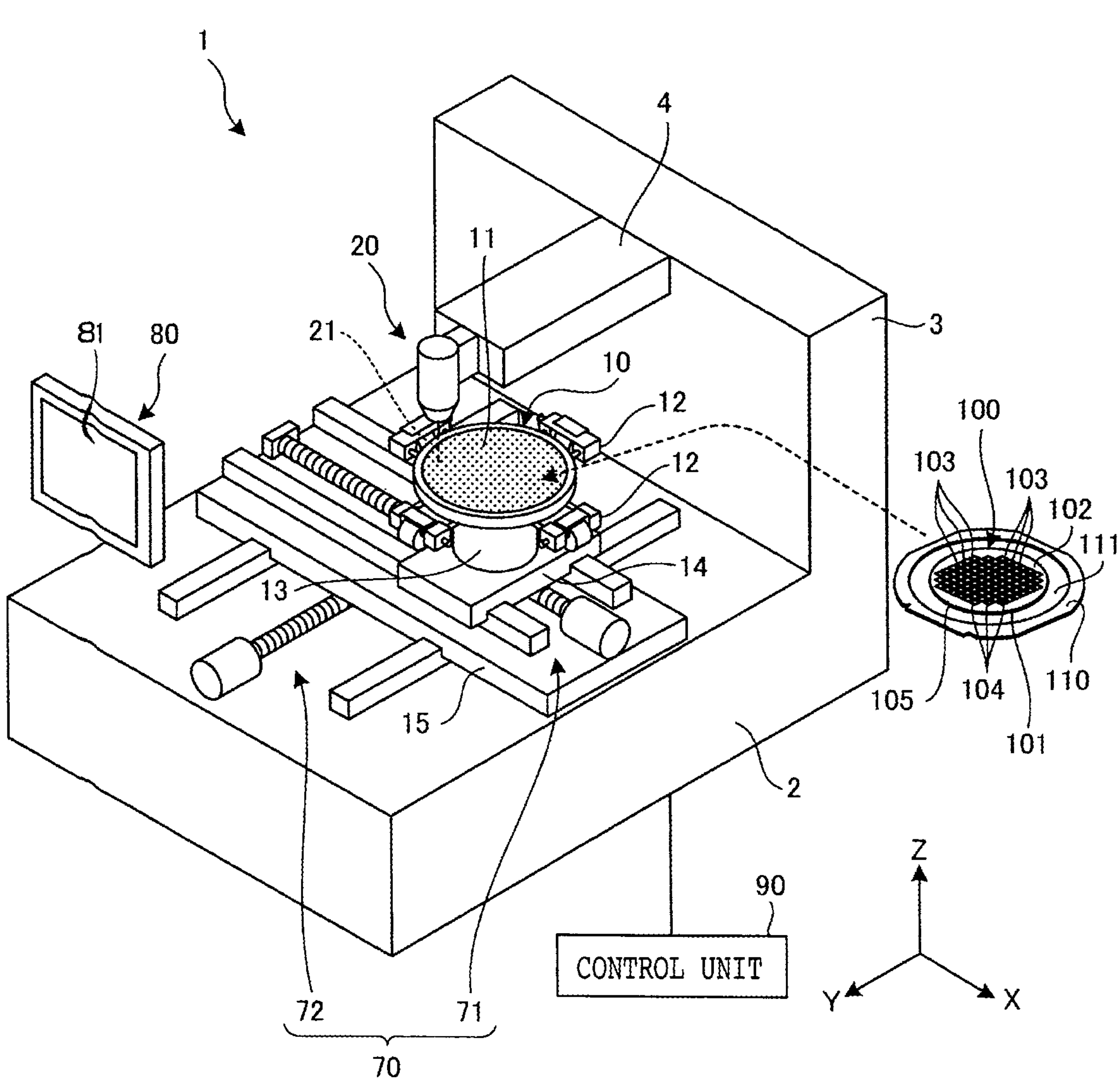
FIG. 1 is a perspective view illustrating a configuration example of a laser processing apparatus according to a first embodiment.

First, a configuration of a laser processing apparatus 1 according to a first embodiment of the present invention will be described based on drawings. FIG. 1 is a perspective view illustrating a configuration example of the laser processing apparatus 1 according to the first embodiment. In the following description, an X-axis direction is one direction in a horizontal plane. A Y-axis direction is a direction orthogonal to the X-axis direction in the horizontal plane. A Z-axis direction is a direction orthogonal to the X-axis direction and the Y-axis direction. In the laser processing apparatus 1 of the first embodiment, a processing feed direction is the X-axis direction, and an indexing feed direction is the Y-axis direction.

As illustrated in FIG. 1, the laser processing apparatus 1 includes a holding table 10, a laser beam irradiation unit 20, a movement unit 70, a display unit 80, and a control unit 90. The laser processing apparatus 1 according to the first embodiment is an apparatus that processes a workpiece 100 held on the holding table 10 by irradiating the workpiece 100 with a pulsed laser beam 21 by the laser beam irradiation unit 20. The processing of the workpiece 100 by the laser processing apparatus 1 is, for example, groove processing by which grooves are formed in a front surface of the workpiece 100, cutting processing by which the workpiece 100 is cut along planned dividing lines, or the like.

In the first embodiment, the workpiece 100 is a wafer such as a circular plate-shaped semiconductor device wafer or optical device wafer that includes a substrate 101 made of silicon (Si), sapphire ($Al_2O_3$), gallium arsenide (GaAs), silicon carbide (SiC), lithium tantalate ($LiTaO_3$), or the like. The workpiece 100 is not limited to one in the embodiments and does not need to have a circular plate shape in the present invention.

The workpiece 100 has planned dividing lines 103 set in a lattice manner in a front surface 102 of the substrate 101 and devices 104 formed in respective regions marked out by the planned dividing lines 103. For example, the devices 104 are circuits such as integrated circuits (ICs) or large scale integration (LSI) circuits, or image sensors of a charge coupled device (CCD), complementary metal oxide semiconductor (CMOS), or the like. For example, an adhesive tape 111 to which an annular frame 110 is stuck and that has a diameter larger than an outer diameter of the workpiece 100 is stuck to a back surface 105 of the workpiece 100, and the workpiece 100 is supported in an opening of the frame 110.

The holding table 10 holds the workpiece 100 on a holding surface 11 thereof. The holding surface 11 is formed of a porous ceramic or the like and has a circular plate shape. The holding surface 11 is a flat surface parallel to the horizontal direction in the first embodiment. The holding surface 11 is connected to a vacuum suction source through a vacuum suction path, for example. The holding table 10 holds under suction the workpiece 100 placed on the holding surface 11. A plurality of clamp parts 12 that clamp the frame 110 supporting the workpiece 100 are disposed around the holding table 10.

The holding table 10 is rotated about its axial center extending parallel to the Z-axis direction by a rotation unit 13. The rotation unit 13 is supported on an X-axis direction moving plate 14. The rotation unit 13 and the holding table 10 are moved in the X-axis direction by an X-axis direction movement unit 71 of the movement unit 70 through the X-axis direction moving plate 14. The rotation unit 13 and the holding table 10 are moved in the Y-axis direction by a Y-axis direction movement unit 72 of the movement unit 70 through the X-axis direction moving plate 14, the X-axis direction movement unit 71, and a Y-axis direction moving plate 15.

The laser beam irradiation unit 20 is a unit that irradiates the workpiece 100 held on the holding table 10 with the pulsed laser beam 21 having a predetermined wavelength for processing the workpiece 100. In the first embodiment, part of the laser beam irradiation unit 20 is supported on a tip end of a support column 4 whose base end part is attached to an erected wall 3 disposed upright from an apparatus main body 2. A detailed configuration of the laser beam irradiation unit 20 will be explained in a later description.

The movement unit 70 is a unit that relatively moves the holding table 10 and a focal point of the laser beam 21 with which irradiation is executed from the laser beam irradiation unit 20. The movement unit 70 includes the X-axis direction movement unit 71, the Y-axis direction movement unit 72, a Z-axis direction movement that is not illustrated in the diagram, and a beam condenser movement unit 73 (see FIG. 2). The beam condenser movement unit 73 will be explained in a later description.

The X-axis direction movement unit 71 is a unit that relatively moves the holding table 10 and the focal point of the laser beam 21 with which irradiation is executed from the laser beam irradiation unit 20 in the X-axis direction, which is the processing feed direction. In the first embodiment, the X-axis direction movement unit 71 moves the holding table 10 in the X-axis direction. In the first embodiment, the X-axis direction movement unit 71 is mounted over the apparatus main body 2 of the laser processing apparatus 1. The X-axis direction movement unit 71 supports the X-axis direction moving plate 14 movably in the X-axis direction.

The Y-axis direction movement unit 72 is a unit that relatively moves the holding table 10 and the focal point of the laser beam 21 with which irradiation is executed from the laser beam irradiation unit 20 in the Y-axis direction, which is the indexing feed direction. In the first embodiment, the Y-axis direction movement unit 72 moves the holding table 10 in the Y-axis direction. In the first embodiment, the Y-axis direction movement unit 72 is mounted on the apparatus main body 2 of the laser processing apparatus 1. The Y-axis direction movement unit 72 supports the Y-axis direction moving plate 15 movably in the Y-axis direction.

The X-axis direction movement unit 71 and the Y-axis direction movement unit 72 each include a well-known ball screw, a well-known pulse motor, and well-known guide rails, for example. The ball screw is disposed rotatably about its axial center. The pulse motor rotates the ball screw about the axial center. The guide rails of the X-axis direction movement unit 71 are disposed to be fixed to the Y-axis direction moving plate 15 and support the X-axis direction moving plate 14 movably in the X-axis direction. The guide rails of the Y-axis direction movement unit 72 are disposed to be fixed to the apparatus main body 2 and support the Y-axis direction moving plate 15 movably in the Y-axis direction.

The Z-axis direction movement unit is a unit that relatively moves the holding table 10 and the focal point of the laser beam 21 with which irradiation is executed from the laser beam irradiation unit 20 in the Z-axis direction, which is a focus adjustment direction. The Z-axis direction movement unit moves at least the beam condenser of the laser beam irradiation unit 20 (in the first embodiment, a first beam condenser 32 and a second beam condenser 42 to be described later) in the Z-axis direction. The Z-axis direction movement unit includes at least a well-known one-axis actuator, a well-known pulse motor, and so forth for moving the beam condenser in the Z-axis direction, for example.

The display unit 80 is a display part configured by a liquid crystal display device or the like. The display unit 80 causes a display surface 81 to display a screen for setting processing conditions, the state of the workpiece 100 imaged by an imaging unit that is not illustrated in the diagram, the state of processing operation, and so forth, for example. The imaging unit includes a micro, macro, or 3D microscope, for example, and is disposed adjacent to an irradiation part of the laser beam 21 of the laser beam irradiation unit 20.

When the display surface 81 of the display unit 80 includes a touch panel, the display unit 80 may include an input part. The input part can accept various kinds of operation such as registration of information on the contents of processing by an operator. The input part may be an external input device such as a keyboard. In the display unit 80, information or an image displayed on the display surface 81 is changed by operation from the input part or the like. The display unit 80 may include a notifying device. The notifying device emits at least one of sound and light to notify the operator of the laser processing apparatus 1 of predefined notifying information. The notifying device may be an external notifying device such as a speaker or a light emitting device.

The control unit 90 controls each of the above-described constituent elements of the laser processing apparatus 1 and causes the laser processing apparatus 1 to execute processing operation for the workpiece 100. The control unit 90 is a computer including a calculation processing device as calculating means, a storing device as storing means, and an input-output interface device as communication means. The calculation processing device includes a microprocessor such as a central processing unit (CPU), for example. The storing device has a memory such as a read only memory (ROM) or a random access memory (RAM). The calculation processing device executes various kinds of calculation on the basis of a predetermined program stored in the storing device. According to a calculation result, the calculation processing device outputs various control signals to the above-described respective constituent elements through the input-output interface device to execute control of the laser processing apparatus 1.

Figure 2:
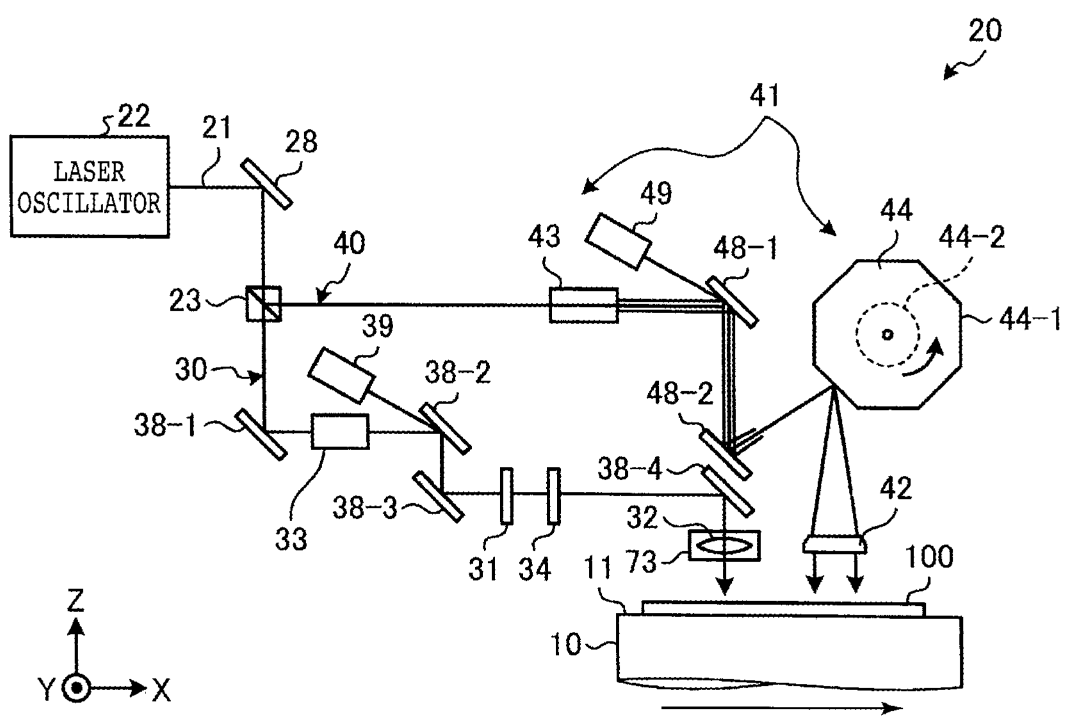
FIG. 2 is a schematic diagram illustrating a schematic configuration of a laser beam irradiation unit of the laser processing apparatus illustrated in FIG. 1.
Figure 3:
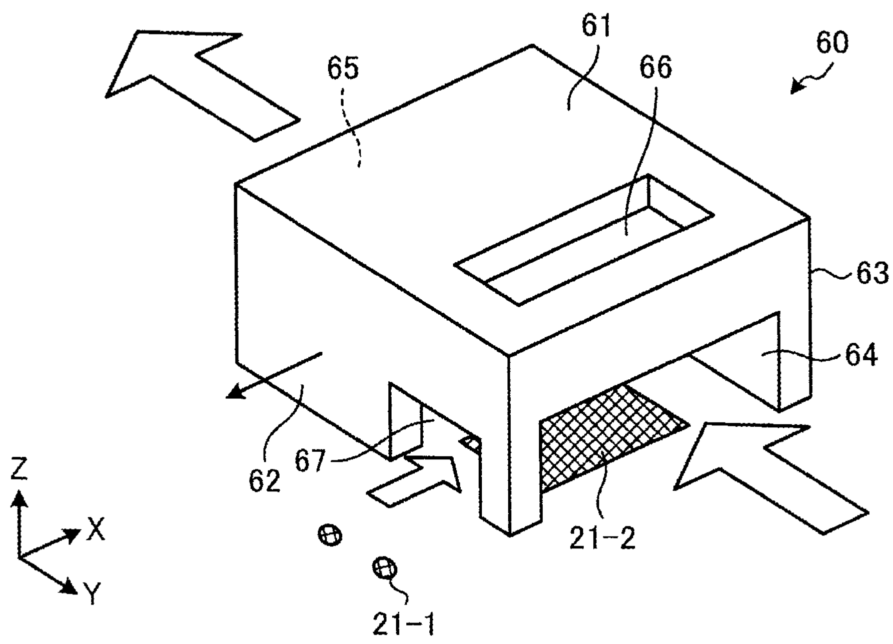
FIG. 3 is a perspective view schematically illustrating a configuration example of a processing point nozzle of the laser beam irradiation unit illustrated in FIG. 1.
Figure 4:
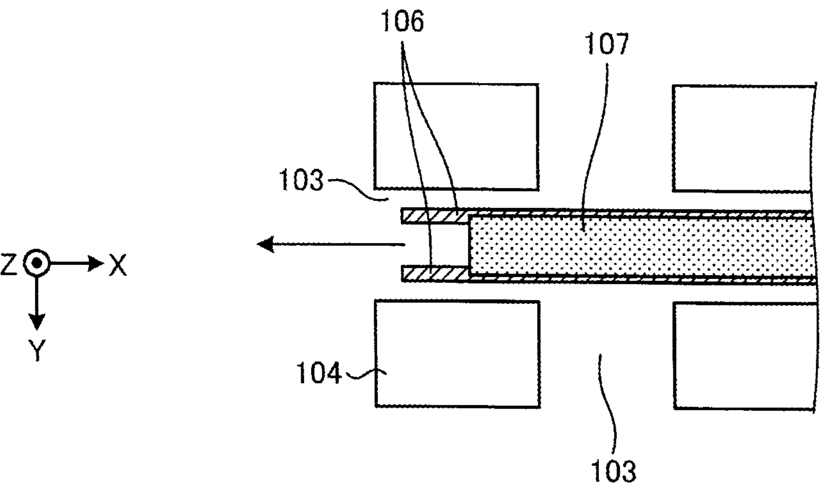
FIG. 4 is a plan view schematically illustrating one example of laser-processed grooves formed by the laser processing apparatus illustrated in FIG. 1.

Next, the configuration of the laser beam irradiation unit 20 will be described in detail. FIG. 2 is a schematic diagram illustrating a schematic configuration of the laser beam irradiation unit 20 of the laser processing apparatus 1 illustrated in FIG. 1. FIG. 3 is a perspective view schematically illustrating a configuration example of a processing point nozzle 60 of the laser beam irradiation unit 20 illustrated in FIG. 1. FIG. 4 is a plan view schematically illustrating one example of laser-processed grooves 106 and 107 formed by the laser processing apparatus 1 illustrated in FIG. 1.

As illustrated in FIG. 2, in the laser beam irradiation unit 20 of the first embodiment, the laser beam 21 is caused to branch into a first optical path 30 and a second optical path 40, and regions separate in the processing feed direction (X-axis direction) in the workpiece 100 held on the holding surface 11 of the holding table 10 are each irradiated with the laser beam 21. The laser beam irradiation unit 20 includes a laser oscillator 22, a first splitting unit 23, a second splitting unit 31, the first beam condenser 32, an output power adjustment mechanism 33, a quarter-wave plate 34, a laser beam scanning unit 41, the second beam condenser 42, mirrors 28, 38-1, 38-2, 38-3, 38-4, 48-1, and 48-2, and beam dampers 39 and 49.

In FIG. 2, an arrow that is illustrated below the holding table 10 and is oriented in the right direction indicates a movement direction of the holding table 10. Further, in FIG. 3, an arrow oriented in the lower left direction indicates a traveling direction of the laser beam 21 with which irradiation is executed by the laser beam irradiation unit 20 and the processing point nozzle 60. Moreover, in FIG. 3, outlined arrows indicate a flow direction of air. In addition, in FIG. 4, an arrow oriented in the left direction indicates the traveling direction of the laser beam 21 with which irradiation is executed by the laser beam irradiation unit 20.

The laser oscillator 22 emits the laser beam 21 having a predetermined wavelength for processing the workpiece 100. The laser beam 21 with which irradiation is executed by the laser beam irradiation unit 20 may be a laser beam with a wavelength having transmissibility with respect to the workpiece 100 or may be a laser beam with a wavelength having absorbability with respect to the workpiece 100.

The first splitting unit 23 causes the laser beam 21 emitted from the laser oscillator 22 to branch into the first optical path 30 and the second optical path 40. The first splitting unit 23 is a polarizing beam splitter (PBS) that separates the incident laser beam 21 into orthogonal components of S-polarized light and P-polarized light. In the first embodiment, the first splitting unit 23 may be a beam splitter that has predetermined transmittance and reflectance and that introduces the transmitted laser beam 21 to the first optical path 30 and introduces the reflected laser beam 21 to the second optical path 40.

The second splitting unit 31 is disposed on the first optical path 30 between the first splitting unit 23 and the first beam condenser 32. The second splitting unit 31 splits the laser beam 21, which has been introduced to the first optical path 30, into at least two laser beams. The second splitting unit 31 splits the laser beam 21 in the width direction (Y-axis direction) of one planned dividing line 103 (see FIG. 1) set in the workpiece 100 to form at least two lines of the laser-processed grooves 106 (see FIG. 4) along the planned dividing line 103.

In the first embodiment, the second splitting unit 31 is a Wollaston prism that separates the incident laser beam 21 into two laser beams 21 of orthogonal linearly-polarized light beams. The two laser beams 21 emitted from the Wollaston prism are emitted with an inclination with respect to the incident direction. Further, the Wollaston prism can change the interval between the two emitted laser beams 21 by rotating.

The first beam condenser 32 focuses the laser beam 21 that has been introduced to the first optical path 30. The first beam condenser 32 focuses each of the laser beams arising from splitting into at least two beams by the second splitting unit 31 and irradiates the workpiece 100 held on the holding surface 11 of the holding table 10 with each laser beam. The first beam condenser 32 moves in the Z-axis direction by the Z-axis direction movement unit that is not illustrated in the diagram, and the height position of the focus is thus adjusted.

Further, in the first embodiment, the first beam condenser 32 is moved in a direction (horizontal direction) parallel to an upper surface of the workpiece 100 relative to the second beam condenser 42 by the beam condenser movement unit 73. For example, the beam condenser movement unit 73 includes a holder that holds the first beam condenser 32, a two-axis actuator for moving the holder in the horizontal direction, and an ultrasonic motor.

The output power adjustment mechanism 33 is disposed on the first optical path 30 between the first splitting unit 23 and the second splitting unit 31. The output power adjustment mechanism 33 adjusts the output power of the laser beam 21 that has been introduced to the first optical path 30. For example, the output power adjustment mechanism 33 includes an attenuator including a half-wave plate, a beam splitter, a beam damper, and so forth. The half-wave plate changes a linear polarization direction of the incident laser beam 21 according to a rotation angle. With regard to the laser beam 21 that has been transmitted through the half-wave plate, the beam splitter reflects the laser beam 21 having a predetermined linear polarization direction toward the beam damper and allows transmission of the laser beam 21 having a linear polarization direction other than the predetermined linear polarization direction.

The quarter-wave plate 34 is disposed on the first optical path 30 between the second splitting unit 31 and the first beam condenser 32. The quarter-wave plate 34 gives a phase difference of $\lambda/4(90°)$ to two polarized components orthogonal to each other in the incident laser beam 21 to convert linearly-polarized light to circularly-polarized light.

The laser beam scanning unit 41 is disposed on the second optical path 40 between the first splitting unit 23 and the second beam condenser 42. The laser beam scanning unit 41 is a unit that executes scanning with the laser beam 21 and introduces the laser beam 21 to the second beam condenser 42. In the first embodiment, the laser beam scanning unit 41 includes an acousto-optic element (acousto-optic deflector (AOD)) 43 and a polygon scanner 44.

The acousto-optic element 43 is disposed on the second optical path 40 between the laser oscillator 22 and the polygon scanner 44. The acousto-optic element 43 executes scanning with the laser beam 21 in the width direction (Y-axis direction) of one planned dividing line 103 (see FIG. 1) set in the workpiece 100. In response to a predetermined high-frequency wave applied thereto, the acousto-optic element 43 deflects the optical path of the incident laser beam 21 in a predetermined direction (in the first embodiment, Y-axis direction) and executes scanning. The acousto-optic element 43 adjusts the angle by which the optical path of the laser beam 21 is deflected, according to the frequency of the applied high-frequency wave. Consequently, scanning with the laser beam 21 is executed in the Y-axis direction.

The polygon scanner 44 executes scanning with the laser beam 21 in the processing feed direction of the movement unit 70 (X-axis direction) and introduces the laser beam 21 to the second beam condenser 42. The polygon scanner 44 includes scanning mirrors 44-1 and a scanning motor 44-2.

The scanning mirrors 44-1 are disposed rotatably or swingably about its axial center extending parallel to the indexing feed direction (Y-axis direction). The scanning mirrors 44-1 are each disposed on a side surface of a polygonal columnar body (in the first embodiment, octagonal columnar body) that rotates about its axial center. The axial center of the scanning mirrors 44-1 is held by a mirror holder that is not illustrated in the diagram. A front focus of the second beam condenser 42 is positioned on the scanning mirror 44-1 on which the laser beam 21 is incident. The scanning motor 44-2 outputs a rotational driving force for rotating or swinging the scanning mirrors 44-1 about its axial center.

The polygon scanner 44 reflects the laser beam 21, with which scanning is executed in the Y-axis direction by the acousto-optic element 43, in a direction parallel to the XZ-plane toward the second beam condenser 42 by using the scanning mirrors 44-1 and rotates the scanning mirrors 44-1 about the axial center extending parallel to the Y-axis direction. In this manner, the polygon scanner 44 executes scanning with the laser beam 21 in the X-axis direction.

The second beam condenser 42 focuses the laser beam 21 introduced to the second optical path 40. The second beam condenser 42 includes an fθ lens. The fθ lens is a lens assembly obtained by combining a plurality of lenses. The second beam condenser 42 focuses the laser beam 21, with which scanning has been executed in the Y-axis direction by the acousto-optic element 43 and scanning has been executed in the X-axis direction by the polygon scanner 44, on the workpiece 100 held on the holding surface 11 of the holding table 10 and irradiates the workpiece 100 with the laser beam 21. The second beam condenser 42 moves in the Z-axis direction by the Z-axis direction movement unit that is not illustrated in the diagram, and the height position of the focus is thus adjusted.

The second beam condenser 42 is disposed at a position separate backward in the processing feed direction of the movement unit 70 (X-axis direction) from the first beam condenser 32. That is, the laser beam 21 focused by the first beam condenser 32 is separate forward in the processing feed direction of the movement unit 70 (X-axis direction) from the laser beam 21 focused by the second beam condenser 42.

As illustrated in FIG. 3, an irradiated region 21-1 of the laser beam 21 focused by the first beam condenser 32 is separate forward in the processing feed direction (X-axis direction) from an irradiated region 21-2 of the laser beam 21 focused by the second beam condenser 42. That is, in one planned dividing line 103 of the workpiece 100, at the same position in the traveling direction of the laser beam 21, irradiation with the laser beam 21 focused by the first beam condenser 32 is executed earlier than irradiation with the laser beam 21 focused by the second beam condenser 42.

As illustrated in FIG. 4, the laser beam 21 focused by the first beam condenser 32 executes what is generally called n laser grooving of forming two lines of the laser-processed grooves 106 along the planned dividing line 103. In the n laser grooving, a functional layer of the workpiece 100 is split. Further, the laser beam 21 focused by the second beam condenser 42 executes what is generally called inside laser grooving of forming the wide-width laser-processed groove 107 that covers the region between the two lines of the laser-processed grooves 106 formed by the laser beam 21 focused by the first beam condenser 32. The beam condenser movement unit 73 illustrated in FIG. 2 can execute alignment of the laser-processed grooves 106 and 107 illustrated in FIG. 4 by adjusting the relative distance in the horizontal direction between the first beam condenser 32 and the second beam condenser 42.

The mirrors 28, 38-1, 38-2, 38-3, 38-4, 48-1, and 48-2 are disposed on the optical paths of the laser beam 21. The mirrors 28, 38-1, 38-2, 38-3, 38-4, 48-1, and 48-2 reflect the laser beam 21 and introduce the laser beam 21 to the respective optical parts of the laser beam irradiation unit 20.

The mirror 28 is disposed on the optical path between the laser oscillator 22 and the first splitting unit 23. The mirror 38-1 is disposed on the first optical path 30 between the first splitting unit 23 and the output power adjustment mechanism 33. The mirror 38-2 and the mirror 38-3 are disposed on the first optical path 30 between the output power adjustment mechanism 33 and the second splitting unit 31. The mirror 38-4 is disposed on the first optical path 30 between the quarter-wave plate 34 and the first beam condenser 32. The mirror 48-1 and the mirror 48-2 are disposed on the second optical path 40 between the acousto-optic element 43 and the polygon scanner 44.

In the first embodiment, the mirror 38-2 is a galvano mirror included in a galvano scanner. Specifically, the mirror 38-2 can change the scanning angle of the laser beam 21 by rotating with respect to the angle of incidence of the laser beam 21 and has a function as a shutter that blocks off the laser beam 21 from the first optical path 30. The mirror 38-2 that functions as the shutter reflects the laser beam 21 toward the beam damper 39. The beam damper 39 terminates the laser beam 21 incident from the mirror 38-2.

In the first embodiment, the mirror 48-1 is a galvano mirror included in a galvano scanner. Specifically, the mirror 48-1 can change the scanning angle of the laser beam 21 by rotating with respect to the angle of incidence of the laser beam 21 and has a function as a shutter that blocks off the laser beam 21 from the second optical path 40. The mirror 48-1 that functions as the shutter reflects the laser beam 21 toward the beam damper 49. The beam damper 49 terminates the laser beam 21 incident from the mirror 48-1.

The shutters disposed on the first optical path 30 and the second optical path 40 are not limited to those in the first embodiment, in which the galvano scanners are used, and may be mechanical shutters such as cylinders, for example.

Further, the laser processing apparatus 1 further includes the processing point nozzle 60 illustrated in FIG. 3. The processing point nozzle 60 is disposed under a processing head attached to the tip end of the support column 4. The processing point nozzle 60 permits passing of the laser beam 21 with which irradiation is executed from the laser beam irradiation unit 20. The processing point nozzle 60 of the embodiment permits passing of the laser beam 21 focused by the second beam condenser 42. The processing point nozzle 60 includes an upper wall 61, sidewalls 62 and 63, an air inflow port 64, an air suction port 65, a first opening 66, and a second opening 67.

The upper wall 61 is located under the second beam condenser 42. The sidewalls 62 and 63 are disposed to hang down from both side edges of the upper wall 61. An upper edge of the sidewall 62 connects to the side edge of the upper wall 61 on the side on which the first beam condenser 32 is disposed relative to the second beam condenser 42 in the X-axis direction. The sidewall 63 is disposed opposed to the sidewall 62 in the X-axis direction. An upper edge of the sidewall 63 connects to the side edge of the upper wall 61 on the side on which the second beam condenser 42 is disposed relative to the first beam condenser 32 in the X-axis direction. That is, the processing point nozzle 60 is configured into a reverse U-shape as viewed in the Y-axis direction by the upper wall 61 and the sidewalls 62 and 63.

The air inflow port 64 is an opening that is surrounded by the upper wall 61 and the sidewalls 62 and 63 and is made at one end part in the Y-axis direction. The air suction port 65 is an opening that is surrounded by the upper wall 61 and the sidewalls 62 and 63 and is made at the other end part in the Y-axis direction, and is opposed to the air inflow port 64. The air suction port 65 is connected to a suction source that is not illustrated in the diagram. Through suction by the suction source, the flow of air that passes through the inside of the processing point nozzle 60 from the air inflow port 64 and comes out from the air suction port 65 is formed. As a result, debris generated in processing by the laser beam 21 focused by the second beam condenser 42 is sucked.

The first opening 66 is made in the upper wall 61. The first opening 66 is made directly under the second beam condenser 42 and permits passing of the laser beam 21 focused by the second beam condenser 42.

The second opening 67 is made in the sidewall 62. When suction is executed by the suction source that is not illustrated in the diagram, the flow of air that passes through the inside of the processing point nozzle 60 from the second opening 67 and comes out from the air suction port 65 is further formed. As a result, debris generated in processing by the laser beam 21 focused by the first beam condenser 32 is sucked. The laser processing apparatus 1 may further have an air blowing nozzle that jets air from the second opening 67 toward the inside of the processing point nozzle 60.

As described above, the laser processing apparatus 1 according to the first embodiment causes the laser beam 21 to branch into the first optical path 30 and the second optical path 40 and first forms the laser-processed grooves 106 that separate the functional layer by using at least two laser beams 21 introduced to the first optical path 30. Then, after forming the laser-processed grooves 106, the laser processing apparatus 1 forms the laser-processed groove 107 by using the laser beam 21 introduced to the second optical path 40 and causes ablation of the region surrounded by the laser-processed grooves 106. This can efficiently divide the workpiece 100 while suppressing peeling-off of the functional layer stacked on the workpiece 100. Further, because the above-described processing can be implemented by one laser processing apparatus 1, an effect that the occupation area necessary in the facility where the workpiece 100 is processed can be reduced is provided.

The present invention is not limited to the above-described first embodiment. That is, the present invention can be implemented with various modifications without departing from the gist of the present invention. For example, the laser beam 21 may be caused to branch into three optical paths as described in a second embodiment and a third embodiment.

Second Embodiment

Figure 5:
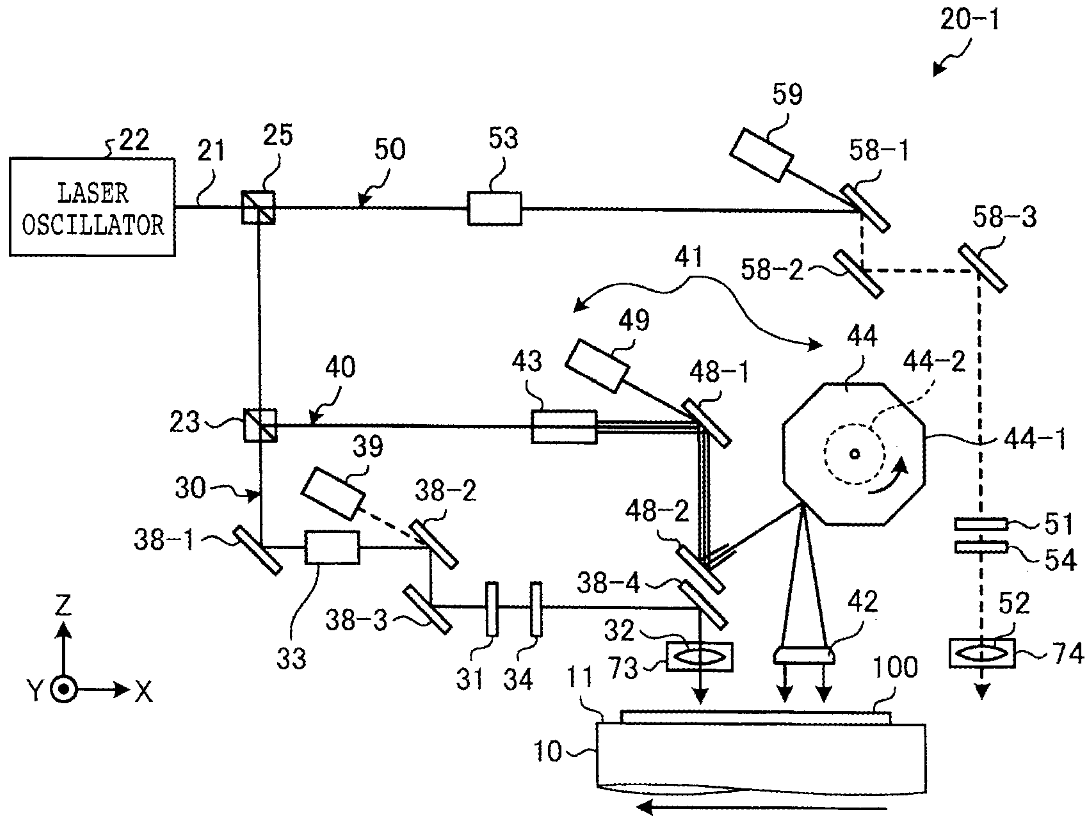
FIG. 5 is a schematic diagram illustrating a schematic configuration of a laser beam irradiation unit according to a second embodiment.
Figure 6:
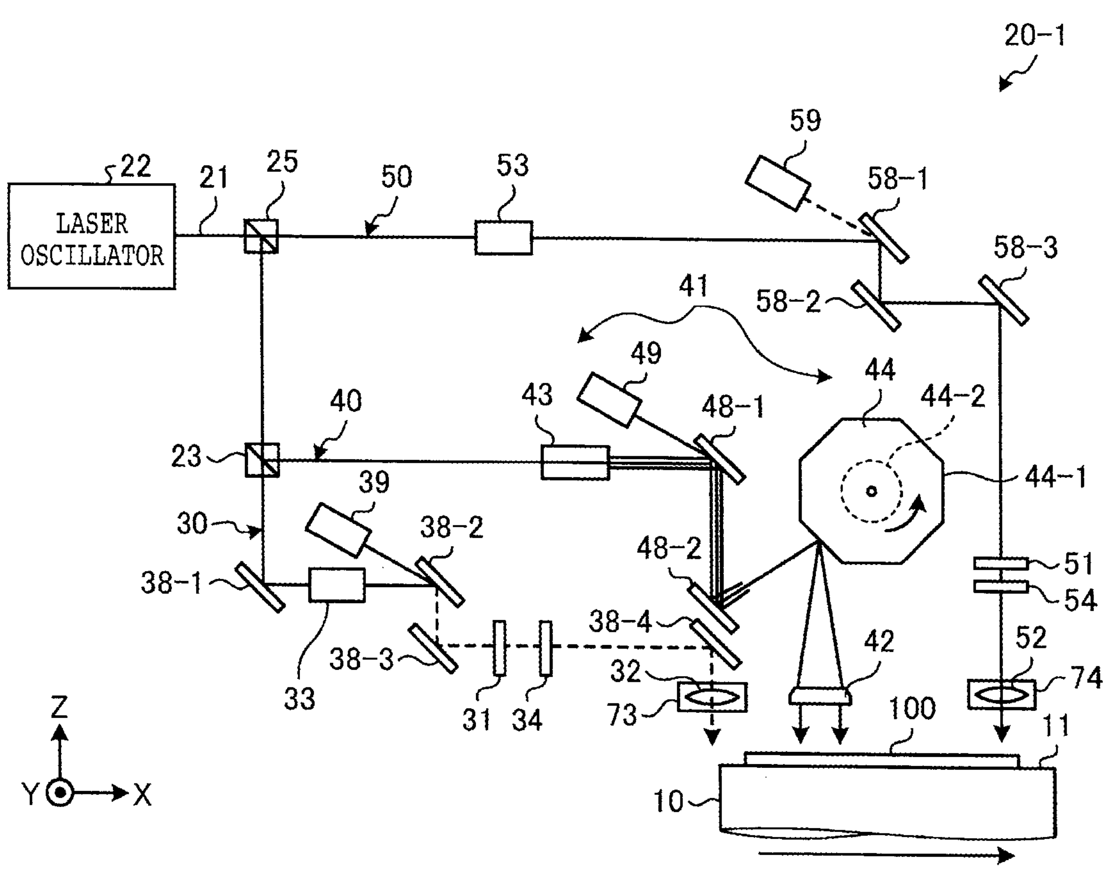
FIG. 6 is a schematic diagram illustrating another state of the laser beam irradiation unit illustrated in FIG. 5.

A configuration of a laser beam irradiation unit 20-1 according to the second embodiment of the present invention will be described based on drawings. FIG. 5 is an explanatory diagram for explaining a schematic configuration of the laser beam irradiation unit 20-1 according to the second embodiment. FIG. 6 is an explanatory diagram for explaining another state of the laser beam irradiation unit 20-1 illustrated in FIG. 5. In the following description, the component same as that of the laser beam irradiation unit 20 of the first embodiment is given the same numeral, and description thereof is omitted.

As illustrated in FIG. 5 and FIG. 6, the laser beam irradiation unit 20-1 of the second embodiment causes the laser beam 21 to branch into the first optical path 30, the second optical path 40, and a third optical path 50 and irradiates, with the laser beam 21, each of regions separate in the processing feed direction (X-axis direction) in the workpiece 100 held on the holding surface 11 of the holding table 10.

Compared with the laser beam irradiation unit 20 of the first embodiment, the laser beam irradiation unit 20-1 of the second embodiment is different in that the laser beam irradiation unit 20-1 includes, instead of the mirror 28, a third splitting unit 25, a fourth splitting unit 51, a third beam condenser 52, an output power adjustment mechanism 53, a quarter-wave plate 54, mirrors 58-1, 58-2, and 58-3, and a beam damper 59. Further, the movement unit 70 (see FIG. 1) further includes a beam condenser movement unit 74.

The third splitting unit 25 causes the laser beam 21 emitted from the laser oscillator 22 to branch into an optical path toward the first splitting unit 23 and the third optical path 50. The third splitting unit 25 is a polarizing beam splitter that separates the incident laser beam 21 into orthogonal components of S-polarized light and P-polarized light. In the second embodiment, for example, the third splitting unit 25 may be a beam splitter that has predetermined transmittance and reflectance and that introduces the transmitted laser beam 21 to the side of the first splitting unit 23 and introduces the reflected laser beam 21 to the third optical path 50.

The fourth splitting unit 51 is disposed on the third optical path 50 between the third splitting unit 25 and the third beam condenser 52. The fourth splitting unit 51 splits the laser beam 21, which has been introduced to the third optical path 50, into at least two laser beams. The fourth splitting unit 51 splits the laser beam 21 in the width direction (Y-axis direction) of one planned dividing line 103 (see FIG. 1) set in the workpiece 100 to form at least two lines of the laser-processed grooves 106 (see FIG. 4) along the planned dividing line 103.

The third beam condenser 52 focuses the laser beam 21 that has been introduced to the third optical path 50. The third beam condenser 52 focuses each of the laser beams arising from splitting into at least two beams by the fourth splitting unit 51 and irradiates the workpiece 100 held on the holding surface 11 of the holding table 10 with each laser beam. The third beam condenser 52 moves in the Z-axis direction by the Z-axis direction movement unit that is not illustrated in the diagram, and the height position of the focus is thus adjusted.

The third beam condenser 52 is disposed at a position that is separate from the second beam condenser 42 in the processing feed direction of the movement unit 70 (X-axis direction) and that is a symmetric position on the side opposite to the first beam condenser 32 across the second beam condenser 42. That is, in a forward path illustrated in FIG. 5, the laser beam 21 focused by the first beam condenser 32 is separate forward in the processing feed direction of the movement unit 70 (X-axis direction) from the laser beam 21 focused by the second beam condenser 42. In contrast, in a backward path illustrated in FIG. 6, the laser beam 21 focused by the third beam condenser 52 is separate forward in the processing feed direction of the movement unit 70 (X-axis direction) from the laser beam 21 focused by the second beam condenser 42.

Further, in the second embodiment, the third beam condenser 52 is moved in the direction (horizontal direction) parallel to the upper surface of the workpiece 100 relative to the second beam condenser 42 by the beam condenser movement unit 74. For example, the beam condenser movement unit 74 includes a holder that holds the third beam condenser 52, a two-axis actuator for moving the holder in the horizontal direction, and an ultrasonic motor.

The output power adjustment mechanism 53 is disposed on the third optical path 50 between the third splitting unit 25 and the fourth splitting unit 51. The output power adjustment mechanism 53 adjusts the output power of the laser beam 21 that has been introduced to the third optical path 50. For example, the output power adjustment mechanism 53 includes an attenuator including a half-wave plate, a beam splitter, a beam damper, and so forth. The half-wave plate changes the linear polarization direction of the incident laser beam 21 according to the rotation angle. With regard to the laser beam 21 that has been transmitted through the half-wave plate, the beam splitter reflects the laser beam 21 having a predetermined linear polarization direction toward the beam damper and allows transmission of the laser beam 21 having a linear polarization direction other than the predetermined linear polarization direction.

The quarter-wave plate 54 is disposed on the third optical path 50 between the fourth splitting unit 51 and the third beam condenser 52. The quarter-wave plate 54 gives a phase difference of $\lambda/4(90°)$ to two polarized components orthogonal to each other in the incident laser beam 21 to convert linearly-polarized light to circularly-polarized light.

The mirrors 58-1, 58-2, and 58-3 are disposed on the third optical path 50 of the laser beam 21. The mirrors 58-1, 58-2, and 58-3 reflect the laser beam 21 and introduce the laser beam 21 to the respective optical parts of the laser beam irradiation unit 20-1. The mirrors 58-1, 58-2, and 58-3 are disposed on the third optical path 50 between the output power adjustment mechanism 53 and the fourth splitting unit 51.

In the second embodiment, the mirror 58-1 is a galvano mirror included in a galvano scanner. Specifically, the mirror 58-1 can change the scanning angle of the laser beam 21 by rotating with respect to the angle of incidence of the laser beam 21 and has a function as a shutter that blocks off the laser beam 21 from the third optical path 50. The mirror 58-1 that functions as the shutter reflects the laser beam 21 toward the beam damper 59. The beam damper 59 terminates the laser beam 21 incident from the mirror 58-1.

Third Embodiment

Figure 7:
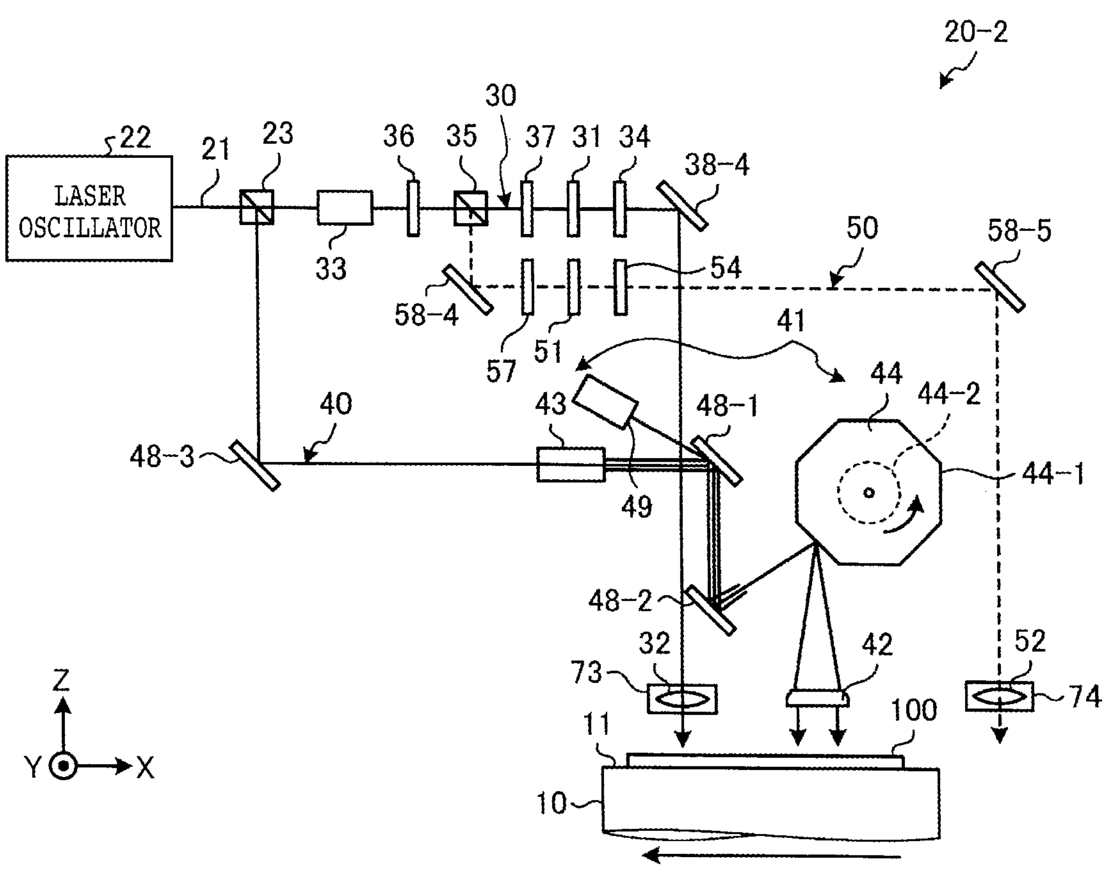
FIG. 7 is a schematic diagram illustrating a schematic configuration of a laser beam irradiation unit according to a third embodiment.
Figure 8:
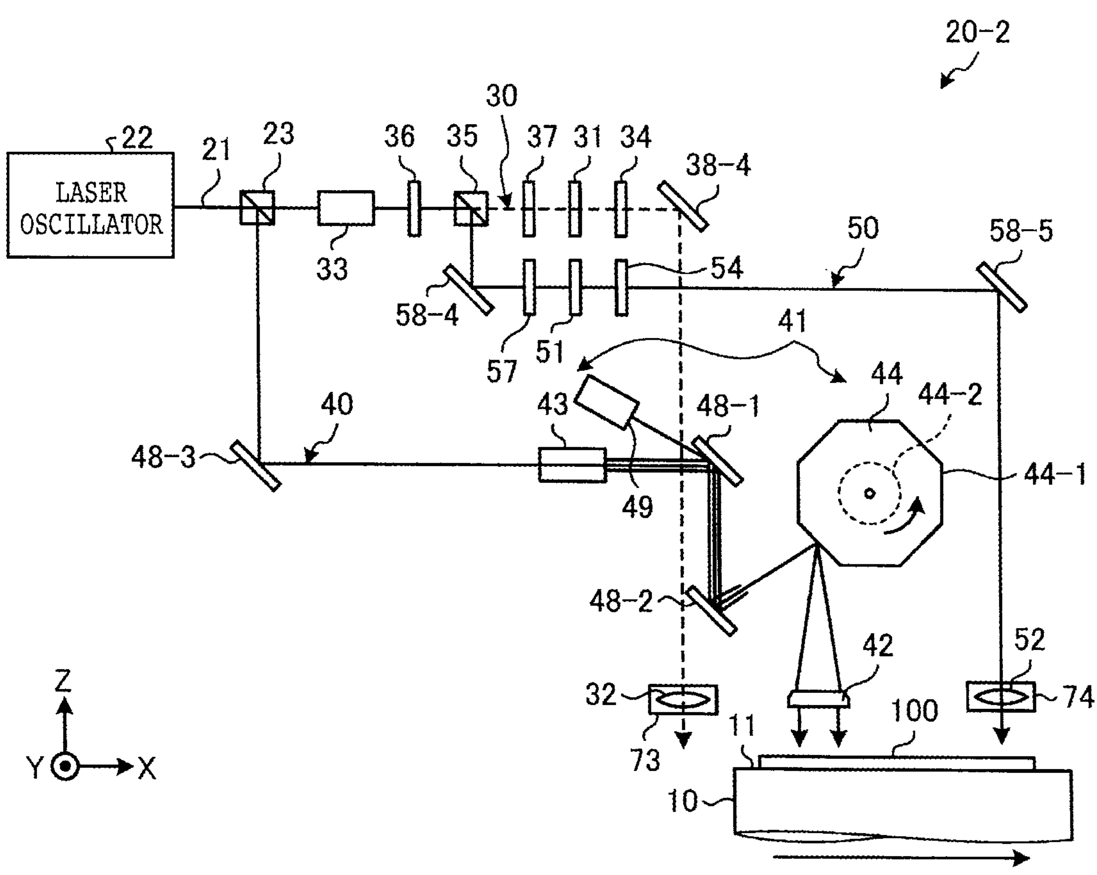
FIG. 8 is a schematic diagram illustrating another state of the laser beam irradiation unit illustrated in FIG. 7.

A configuration of a laser beam irradiation unit 20-2 according to the third embodiment of the present invention will be described based on drawings. FIG. 7 is an explanatory diagram for explaining a schematic configuration of the laser beam irradiation unit 20-2 according to the third embodiment. FIG. 8 is an explanatory diagram for explaining another state of the laser beam irradiation unit 20-2 illustrated in FIG. 7. In the following description, the component same as that of the laser beam irradiation unit 20 of the first embodiment or that of the laser beam irradiation unit 20-1 of the second embodiment is given the same numeral, and description thereof is omitted.

As illustrated in FIG. 7 and FIG. 8, similarly to the laser beam irradiation unit 20-1 of the second embodiment, the laser beam irradiation unit 20-2 of the third embodiment causes the laser beam 21 to branch into the first optical path 30, the second optical path 40, and the third optical path 50 and irradiates, with the laser beam 21, each of regions separate in the processing feed direction (X-axis direction) in the workpiece 100 held on the holding surface 11 of the holding table 10. However, the laser beam irradiation unit 20-2 of the third embodiment makes a branch from the first optical path 30 into the third optical path 50 at a stage subsequent to a branch into the first optical path 30 and the second optical path 40, whereas the laser beam irradiation unit 20-1 of the second embodiment has the configuration in which the branch into the third optical path 50 is made at a stage previous to the branch into the first optical path 30 and the second optical path 40.

Compared with the laser beam irradiation unit 20-1 of the second embodiment, the laser beam irradiation unit 20-2 of the third embodiment is different in that the laser beam irradiation unit 20-2 includes a third splitting unit 35, half-wave plates 36, 37, and 57, and mirrors 48-3, 58-4, and 58-5, instead of the third splitting unit 25, the output power adjustment mechanism 53, the mirrors 38-1, 38-2, 38-3, 58-1, 58-2, and 58-3, and the beam dampers 39 and 59. Further, the fourth splitting unit 51 is disposed on the third optical path 50 between the third splitting unit 35 and the third beam condenser 52.

The third splitting unit 35 is disposed on the first optical path 30 between the output power adjustment mechanism 33 and the second splitting unit 31. The third splitting unit 35 causes the laser beam 21 that has been introduced to the first optical path 30 to branch into the first optical path 30 toward the second splitting unit 31 and the third optical path 50. The third splitting unit 35 is a polarizing beam splitter that separates the incident laser beam 21 into orthogonal components of S-polarized light and P-polarized light.

The half-wave plate 36 is disposed on the first optical path 30 between the output power adjustment mechanism 33 and the third splitting unit 35. The half-wave plate 36 changes the polarization direction of linearly-polarized light of the incident laser beam 21 according to the rotation angle. That is, the half-wave plate 36 changes the direction in which the laser beam 21 is emitted from the third splitting unit 35 to either the first optical path 30 or the third optical path 50 according to the rotation angle.

The half-wave plate 37 is disposed on the first optical path 30 between the third splitting unit 35 and the second splitting unit 31. The half-wave plate 37 changes the polarization direction of linearly-polarized light of the incident laser beam 21 according to the rotation angle. The half-wave plate 37 converts the laser beam 21 that has been introduced to the first optical path 30 to a non-polarized state.

The half-wave plate 57 is disposed on the third optical path 50 between the third splitting unit 35 and the fourth splitting unit 51. The half-wave plate 57 changes the polarization direction of linearly-polarized light of the incident laser beam 21 according to the rotation angle. The half-wave plate 57 converts the laser beam 21 that has been introduced to the third optical path 50 to the non-polarized state.

The mirrors 48-3, 58-4, and 58-5 are disposed on the optical paths of the laser beam 21. The mirrors 48-3, 58-4, and 58-5 reflect the laser beam 21 and introduce the laser beam 21 to the respective optical parts of the laser beam irradiation unit 20-2.

The mirror 48-3 is disposed on the second optical path 40 between the first splitting unit 23 and the acousto-optic element 43. The mirror 58-4 is disposed on the third optical path 50 between the third splitting unit 35 and the half-wave plate 57. The mirror 58-5 is disposed on the third optical path 50 between the quarter-wave plate 54 and the third beam condenser 52. In FIG. 7 and FIG. 8, mirrors that are not illustrated in the diagram may be disposed as appropriate at places where the optical paths of the laser beam 21 interfere with each other, and the laser beam 21 may be caused to take a detour in the direction toward the near side or far side of the plane of paper.

As described above, in the laser processing apparatuses including the laser beam irradiation units 20-1 and 20-2 according to the second embodiment and the third embodiment, the first beam condenser 32 and the third beam condenser 52 are disposed at positions that sandwich the second beam condenser 42 in the processing feed direction, and irradiation with the laser beam 21 introduced to the first optical path 30 and irradiation with the laser beam 21 introduced to the third optical path 50 can selectively be executed. Due to this, in both the forward path and the backward path in the processing feed direction, the laser-processed grooves 106 that separate the functional layer can be formed in advance by at least two laser beams 21 introduced to the first optical path 30 or the third optical path 50 before the laser-processed groove 107 is formed by the laser beam 21 introduced to the second optical path 40 and the region surrounded by the laser-processed grooves 106 is subjected to ablation.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser processing apparatus comprising:

a holding table that holds a workpiece;

a laser beam irradiation unit that focuses a pulsed laser beam and irradiates the workpiece held on the holding table with the laser beam to execute processing and forms laser-processed grooves in the workpiece; and a movement unit that relatively moves the holding table and a focal point of the laser beam, the movement unit being configured to move the holding table and the focal point of the laser beam in a processing feed (X-axis) direction, wherein the laser beam irradiation unit includes a laser oscillator, a first splitting unit that causes the laser beam emitted from the laser oscillator to branch into a first optical path and a second optical path, a first beam condenser that focuses the laser beam having been introduced to the first optical path, a second beam condenser that focuses the laser beam having been introduced to the second optical path, a second splitting unit that is disposed on the first optical path between the first splitting unit and the first beam condenser and that splits the laser beam having been introduced to the first optical path into at least two laser beams, and a laser beam scanning unit that is disposed on the second optical path between the first splitting unit and the second beam condenser and that executes scanning with the laser beam having been introduced to the second optical path and introduces the laser beam to the second beam condenser.

2. The laser processing apparatus according to claim 1, wherein the laser beam focused by the first beam condenser is positioned forward in the processing feed (X-axis)

direction from the position the laser beam is focused by the second beam condenser as defined by the direction of movement of the holding table such that the laser beam focused by the first beam condenser is focused on a position of the workpiece prior to the laser beam focused by the second beam condenser being focused on the same position of the workpiece.

3. The laser processing apparatus according to claim 1, wherein the second splitting unit splits the laser beam in a width (Y-axis) direction of a planned dividing line set in the workpiece to form at least two lines of laser-processed grooves along the planned dividing line, the width (Y-axis) direction being perpendicular to the processing feed direction.

4. The laser processing apparatus according to claim 1, wherein the laser beam scanning unit includes a polygon scanner that executes scanning with the laser beam in the processing feed direction of the movement unit and introduces the laser beam to the second beam condenser, and an acousto-optic element that is disposed on the first optical path between the laser oscillator and the polygon scanner and that executes scanning with the laser beam in a width direction of a planned dividing line set in the workpiece, the width (Y-axis) direction being perpendicular to the processing feed direction.

5. The laser processing apparatus according to claim 1, wherein the movement unit includes a beam condenser movement unit that moves the first beam condenser in a direction parallel to an upper surface of the workpiece, relative to the second beam condenser.

6. The laser processing apparatus according to claim 1, wherein the laser beam irradiation unit further includes a third splitting unit that is disposed on an optical path between the laser oscillator and the first splitting unit and that causes the laser beam emitted from the laser oscillator to further branch into a third optical path, a third beam condenser that focuses the laser beam having been introduced to the third optical path, and a fourth splitting unit that is disposed on the third optical path between the third splitting unit and the third beam condenser and that splits the laser beam having been introduced to the third optical path into at least two laser beams, and the laser beam focused by the first beam condenser and the laser beam focused by the third beam condenser are separate on sides opposite to each other across the laser beam focused by the second beam condenser, in a processing feed direction of the movement unit.

7. The laser processing apparatus according to claim 1, wherein the laser beam irradiation unit further includes a third splitting unit that is disposed on the first optical path between the first splitting unit and the second splitting unit and that causes the laser beam having been introduced to the first optical path to further branch into a third optical path, a third beam condenser that focuses the laser beam having been introduced to the third optical path, and a fourth splitting unit that is disposed on the third optical path between the third splitting unit and the third beam condenser and that splits the laser beam having been introduced to the third optical path into at least two laser beams, and the laser beam focused by the first beam condenser and the laser beam focused by the third beam condenser are separate on sides opposite to each other across the laser beam focused by the second beam condenser, in a processing feed direction of the movement unit.

8. The laser processing apparatus according to claim 1, wherein the second splitting unit is a Wollaston prism.

9. The laser processing apparatus according to claim 1, wherein the first beam condenser focuses each of the laser beams arising from splitting into at least two beams by the second splitting unit and irradiates the workpiece held on the holding table with each laser beam.

10. The laser processing apparatus according to claim 1, further comprising an output power adjustment mechanism disposed on the first optical path between the first splitting unit and the second splitting unit, the output power adjustment mechanism being configured to adjust the output power of the laser beam that has been introduced to the first optical path.

11. The laser processing apparatus according to claim 4, wherein the second beam condenser focuses the laser beam on the second optical path, with which scanning has been executed in the width (Y-axis) direction by the acousto-optic element and scanning has been executed in the processing (X-axis) direction by the polygon scanner, on the workpiece held on a holding surface of the holding table and irradiates the workpiece with the laser beam.

12. The laser processing apparatus according to claim 3, wherein the laser beam scanning unit includes a polygon scanner that executes scanning with the laser beam in the processing feed direction of the movement unit and introduces the laser beam to the second beam condenser, and an acousto-optic element that is disposed on the first optical path between the laser oscillator and the polygon scanner and that executes scanning with the laser beam in a width direction of a planned dividing line set in the workpiece, the width (Y-axis) direction being perpendicular to the processing feed direction.

13. The laser processing apparatus according to claim 12, wherein the second beam condenser focuses the laser beam on the second optical path, with which scanning has been executed in the width (Y-axis) direction by the acousto-optic element and scanning has been executed in the processing (X-axis) direction by the polygon scanner, on the workpiece held on a holding surface of the holding table and irradiates the workpiece with the laser beam.

14. The laser processing apparatus according to claim 13, wherein the workpiece comprises a function layer, and wherein the functional layer of the workpiece is split when the at least two lines of laser-processed grooves are formed along the planned dividing line; and wherein the laser beam focused by the second beam condenser executes an inside laser grooving of forming the wide-width laser-processed groove that covers the region between the two lines of the laser-processed grooves formed by the laser beam focused by the first beam condenser.

15. The laser processing apparatus according to claim 14, wherein the movement unit is configured to adjust the relative distance in the processing (X-axis) direction between the first beam condenser and the second beam condenser.

16. The laser processing apparatus according to claim 14, further comprising a processing point nozzle that permits passing of the laser beam focused by the second beam condenser.

17. The laser processing apparatus according to claim 2, further comprising a processing point nozzle, wherein the processing point nozzle includes an upper wall located under the second beam condenser and having a first opening permits passing of the laser beam focused by the second beam condenser, two sidewalls disposed to hang down from both side edges of the upper wall and opposed each other in the processing feed (X-axis) direction, one of the two sidewalls having a second opening, an air inflow port surrounded by the upper wall and the two sidewalls and made at one end part in an indexing feed (Y-axis) direction perpendicular to the processing feed (X-axis) direction, and an air suction port surrounded by the upper wall and the two sidewalls and made at the other end part in the indexing feed (Y-axis) direction.

* * * * *